(12) United States Patent
Novel

(10) Patent No.: US 6,243,589 B1
(45) Date of Patent: Jun. 5, 2001

(54) PC CARD FOR USE IN A TELECOMMUNICATIONS SYSTEM

(76) Inventor: Gordon Novel, 565 Central Ave., Suite 209, Jefferson, LA (US) 70121

(*) Notice: Subject to any disclaimer, the term of this patent is extended or adjusted under 35 U.S.C. 154(b) by 0 days.

(21) Appl. No.: 09/289,381

(22) Filed: Apr. 12, 1999

(51) Int. Cl.$^7$ .................................................. H04Q 7/32
(52) U.S. Cl. ........................ 455/466; 455/552; 455/556; 455/558; 455/432
(58) Field of Search ..................... 450/458, 459, 450/460, 461, 466, 426, 66, 456, 556, 557, 558, 552, 553, 31.2, 31.3, 38.3, 343; 340/825.44, 870; 455/432

(56) References Cited

U.S. PATENT DOCUMENTS

| Re. 33,417 | 10/1990 | Bhagat et al. ................ 455/460 |
| 4,713,837 | 12/1987 | Gordon . |
| 4,905,273 | 2/1990 | Gordon et al. . |
| 4,922,518 | 5/1990 | Gordon et al. . |
| 5,703,390 | 12/1997 | Miska et al. ................. 455/426 |
| 5,809,115 | 9/1998 | Inkinen ........................ 455/557 |
| 5,956,651 | 9/1999 | Willkie et al. ................ 455/553 |
| 6,085,090 | 7/2000 | Yee et al. .................... 455/456 |

FOREIGN PATENT DOCUMENTS

WO 88/0683   9/1988   (WO) .

Primary Examiner—Reinhard Eisenzopf
Assistant Examiner—Lester G. Kincaid
(74) Attorney, Agent, or Firm—Banner & Witcoff, Ltd.

(57) ABSTRACT

A PC card for enabling a host device for use on a telecommunications network. The micro-processor based card includes transmission and receiver circuitry which form a wireless telephone and a telemetry receiver. The telemetry receiver is used to receive a "wake-up" telemetry signal which activates the card and causes the wireless telephone to call a predetermined telephone number. The call terminates at a telecommunications network switch which then establishes a two way connection between the host device and the person wishing to have the communication.

18 Claims, 3 Drawing Sheets

PC CARD FOR USE IN A TELECOMMUNICATIONS SYSTEM

BACKGROUND OF THE INVENTION

The present invention generally relates to the field of telecommunications and more particularly, is directed to a PC card which can be used to automatically receive, transmit and relay telecommunications information and data. The PC card has particular application in a wide area telecommunications system where the location of the intended recipient of a communication is unknown to the sender.

In recent years, wireless systems, such as cellular and the like, have come into their own as viable alternatives to land-based hard wired systems. In fact, many telephone users have come to rely almost exclusively on wireless telephones as their primary means of voice communications when away from their office or home. The wide use and broad appeal of wireless telephones is demonstrated by the fierce competition among wireless service providers to sign up subscribers.

Wireless telephone systems represent a substantial improvement over land based systems with respect to convenience and the ability to make or receive telephone calls at many more times and from many more locations than possible using a land-based system. As wireless services have become more popular, subscribers have continued to demand more from them. Thus, the ability to conduct economical communications at any time and between any two locations in the world is now in great demand. Present wireless systems can not meet this demand and are deficient in a number of areas including, their high service fees, lack of availability in many areas and limited service features.

SUMMARY OF THE INVENTION

Accordingly, it is an object of the present invention to obviate the above-noted shortcomings and disadvantages of telecommunication systems known in the art.

Another object of the present invention is to provide a telecommunications PC card which can be used to enable a host device for use on a telecommunications network.

It is a still further object of the present invention to provide a PC card which can be easily and inexpensively implemented with telecommunication functions.

It is another object of the present invention to provide a PC card which can be used to implement telecommunication functions in a wide variety of electronics devices.

BRIEF DESCRIPTION OF THE DRAWINGS

The novel features of the present invention are set out with particularity in the appended claims, but the invention will be understood more fully and clearly from the following detailed description of the invention as set forth in the accompanying drawings in which:

DESCRIPTION OF THE PREFERRED EMBODIMENT

Figure 1:
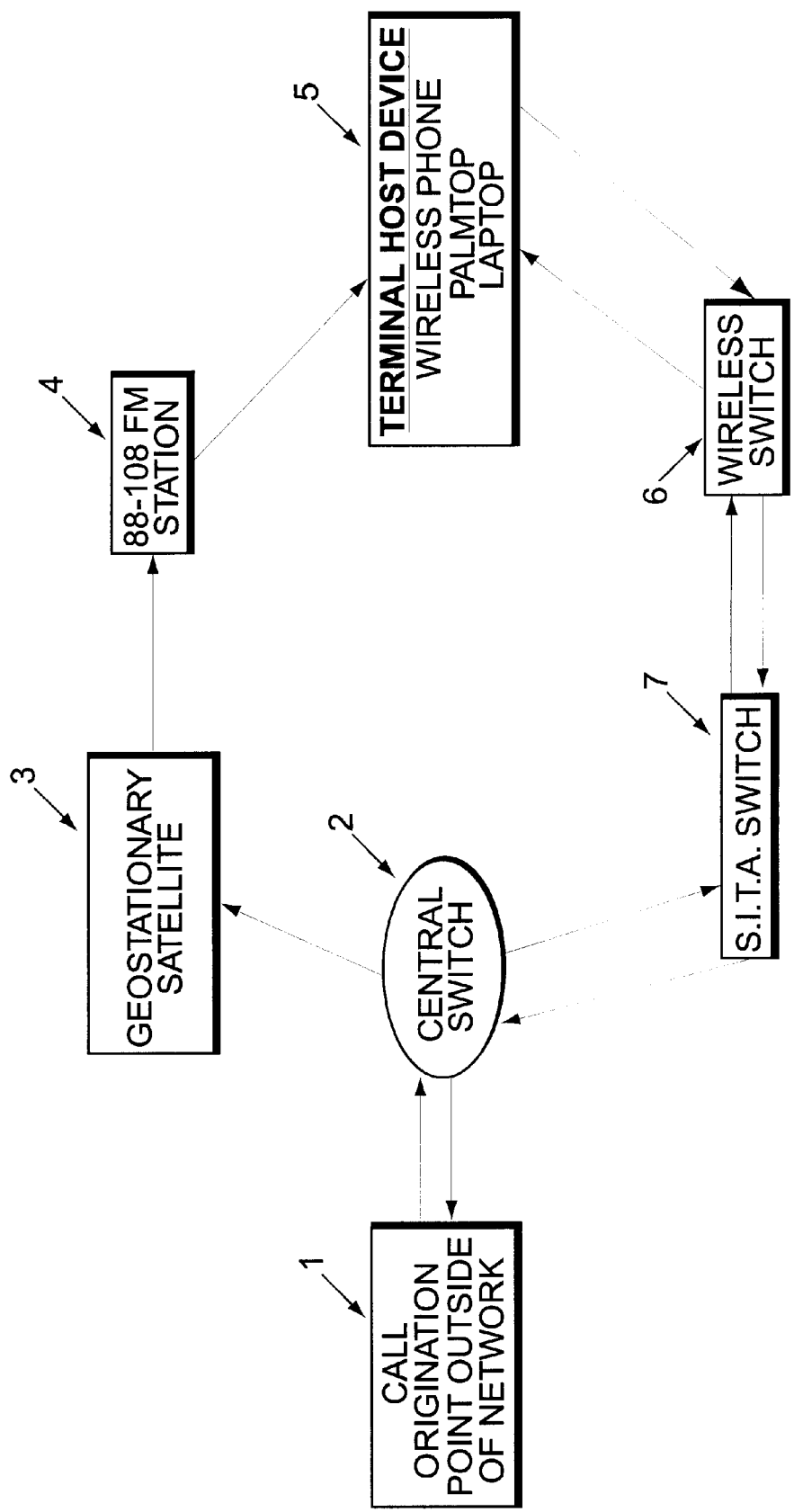
FIG. 1 is a block diagram of a telecommunications network having a host terminal in which the present invention may be used.

FIG. 1 illustrates one embodiment of a telecommunications network having a host terminal device in which the present invention may be used.

When one wishes to communicate with terminal host device 5, which may be a wireless telephone, laptop computer and the like, the caller 1 places a telephone call to central switch 2 using the preassigned "telephone number" of the host device. Central switch 2 then sends a "query" telemetry signal to Geostationary satellite 3. The telemetry signal can be transmitted by satellite directly to host device 5 or to a radio paging facility in the area in which the host device is located.

As shown in FIG. 1, the telemetry signal is sent to FM station 4 which has paging facilities. The paging signal is receive by host device 5 which causes the host device to "wake-up" and initiate a call back to central switch 2. The call back may, for example, be routed through wireless switch 6 and S.I.T.A. switch 7.

When the call back is received by central switch 2, a two-way connection is established between caller 1 and host device 5.

In communications networks such as the type illustrated in FIG. 1, data is typically sent from one point to another using established protocols and standards. These protocols and standards allow equipment from various manufacturers and of various designs to exchange data without the need for special interfaces or conversion processes and the like.

A well established way of sending data over a communications network is to partition the data into small packets having a regular format. Each packet, also known in the art as a datagram, includes an electronic address which is used to route the packet across the network to its designation. The packets are then reassembled at the destination and the data restored to its original or some other prearranged format.

Data communications is often conducted in accordance with the Internet Protocol (IP) suite. The IP suite provides for the transmission of packets from source to destination through the various interconnected devices which form the network. While the IP suite does not guarantee delivery of each packet, the integrity of the data carried by the packet, or the order in which the packets arrive at the destination, it does provide error protection for some of the critical information within the packet.

Figure 2A:
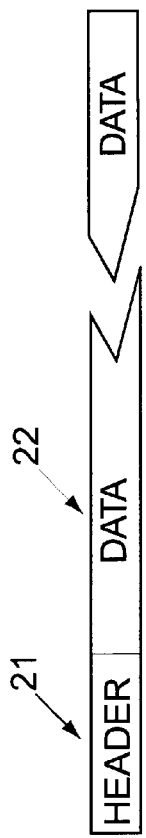
FIG. 2 illustrates the packet data format which may be used to moved data between various components of the telecommunications network illustrated in FIG. 1.
Figure 2B:
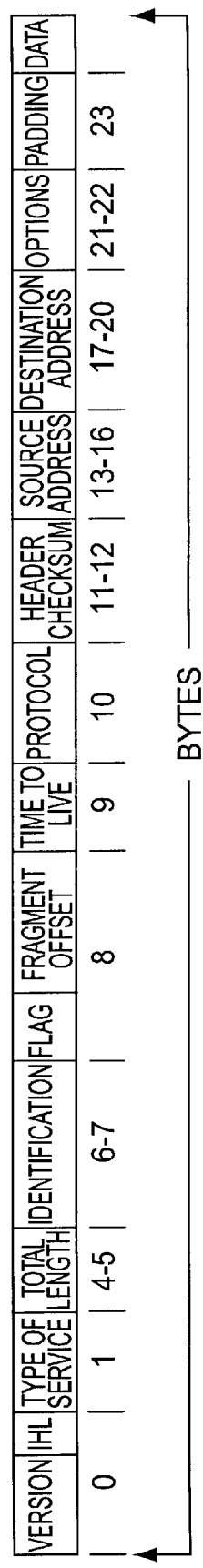

FIG. 2A illustrates the format of an IP packet. The packet includes a header portion 21, which carries control information about the packet, and data portion 22, which contains the data being carried by the packet. Header portion 21 typically has a fixed format and length while data portion 22 may vary in length. FIG. 2B is a more detailed illustration of the format of an IP packet with header portion 21 and data portion 22. As shown in FIG. 2B:

Byte 0 of header 21 includes a 4-bit Version field which indicates the format of the header and a 4-bit Header Length (IHL) field which indicates the length of the Internet header in 32-bit words.

Byte 1 is an 8-bit Type Of Service Field which indicates the type of service which is to be given to the packet.

Bytes 4 and 5 form a 16-bit Total Length field which indicates the total length of the packet (including header and data) measured in octets.

Bytes 6 and 7 form a 16-bit Identification field which contains a value assigned by the sending device to aid in assembling the packets.

Byte 8 includes a 3-bit Flags field which contains flags controlling fragmentation of the packet and a 13 bit Fragment Offset field which indicates where in the packet this fragment belongs.

Byte 9 is an 8-bit Time To Live field which places a limit on the life span of the packet.

Byte 10 is an 8-bit Protocol field which indicates the protocol associated with the data in the data portion of the packet.

Bytes 11 and 12 form a 16-bit Header Checksum field which represents a checksum computed on the packet header field only.

Bytes 13–16 contain a 32-bit IP address which specifies the Source Address of the packet.

Bytes 17–20 contain a 32-bit IP address which specifies the Destination Address of the packet.

Bytes 21–22 form a variable length Option field.

Byte 23 is a Padding field.

The source and destination IP addresses contained in the packet header are divided into two fields, a network-identifier and a host-identifier. The network-identifier specifies a particular physical network in the Internet and the host-identifier specifies a particular device attached to the specified physical network.

With respect to telecommunications network illustrated in FIG. 1, each component which comprises the network may be assigned an IP address. For example, each of the multiple terminal host devices 5 which operate on the network may be assigned their own IP address. Thus, when caller 1 places a call to central switch 2 using a telephone number associated with the terminal host device for which communications is desired, central switch 2 can convert the telephone number to the corresponding IP address for the terminal device being called.

In addition, when host device 5 places a call back to central switch 2, it can identify itself to central switch 2 by its IP address.

The use of a packet format to send data back and forth though the network provides most efficient data flow and reliability.

Figure 3:
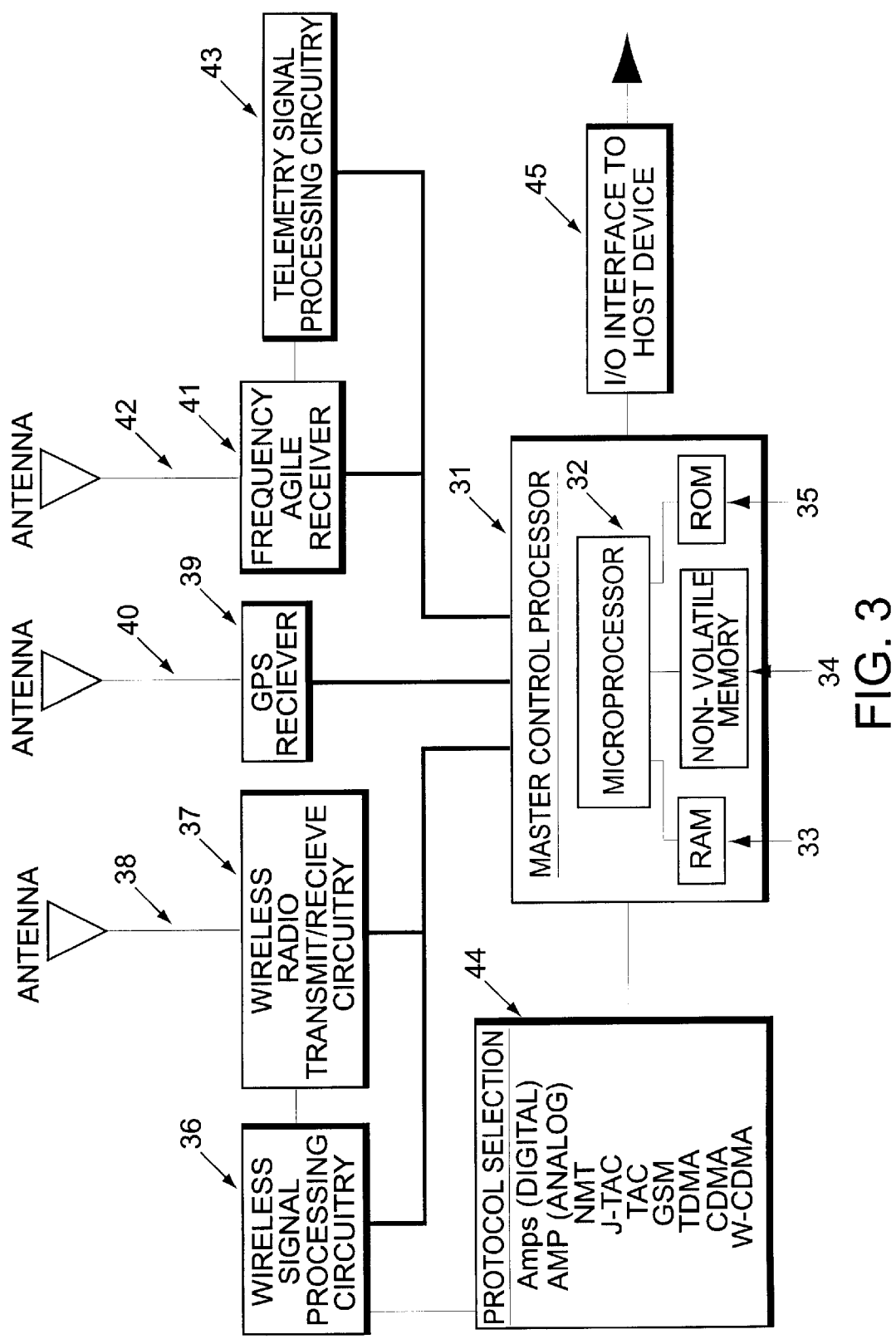
FIG. 3 is a block diagram of a PC card in accordance with the present invention.

FIG. 3 is a block diagram of one embodiment of the PC card according to the present invention. The card includes a number of interconnected elements. A master control processor (MCP) 31 controls the operation and function of each of the elements. MCP 31 is formed of random access memory (RAM) 33, non-volatile memory 34 and read only memory (ROM) 35. These memory elements store data and computer control routines which are executed by microprocessor 32 in order to carry out its control functions.

MCP 31 is coupled to wireless radio transmit/receive circuitry 37 with its antenna 38. This circuitry allows two-way voice and data communication between the user of the device in which the PC card is installed and anyone else with wireless transmit/receive circuitry operating on the same frequency and using one of the supported protocols identified in protocol selection block 44.

Transmit/receive circuitry 37 is coupled to wireless signal processing circuit 36 which is in turn coupled to transmission protocol selection block 44. MCP 31 controls the operation of these elements to select the appropriate transmission protocol in order to conduct the two-way communication.

The PC card also includes a frequency agile receiver 41 and antenna 42. This receiver is designed to receive a "wake up" telemetry signal from someone desiring to establish communications with the user of a PC card enabled host device, such as host device 5 illustrated in FIG. 1.

The wake up signal is processed by telemetry signal processing circuitry 43 and MCP 31. The signal includes data identifying the caller and the type of communication desired. The types of communications may include two-way voice and data, a simple one-way transmission of a text or digital voice message or a remote monitoring function.

If transmission of a voice or data message is indicated, frequency agile receiver 41 will receive the message and send it to the host device for display to the user via I/O interface host device 45. If the wake up signal indicates that two-way voice or data communication is desired, MCP 31 causes wireless radio transmit/receive circuitry 37 to initiate a call back communication with central switch 2 illustrated in FIG. 1. During this call back communication, the recipient's geographical location, as determined by GPS receiver 39 and its antenna 40, may be sent to the central switch. Using the location information, the switch can then determine how to most efficiently route the call to the user.

In the remote monitoring function, MCP 31 controls radio transmit/receive circuitry 37 to initiate a call to a desired telephone number. This mode, however, provides solely a one-way monitoring function so that any sounds picked up by the microphone associated with the transmitter portion of transmit/receive circuitry 37 are transmitted to the distant telephone number.

PC cards have been known in the art for several years. Such cards are commonly used to add peripheral attachments to small scale computer systems such as laptops and the like. PC cards typically are designed to be plugged into a computer port designed in accordance with industry standard PC card specifications with respect to physical size and electronic signal specification.

In the prior art, PC cards typically were used to implement such features as modems, additional hard drive space, memory expansion and the like. They have proved ideal when a device, such as a laptop computer, has only limited space and an effort must be made to keep its weight as low as possible. Thus, the use of PC cards allow the user to select an appropriate card for the function then needed. When a different function is required, the user need only select the appropriate card.

The PC card of the present invention provides the same ease of use as PC cards known in the prior art. The card can be designed in accordance with established specifications for PC cards so that any device with a compatible PC card port can use the card of Applicant's invention. Thus, there already exist a installed base of devices which can easily serve as host for Applicant's card.

It should be obvious from the above-discussed apparatus embodiment that numerous other variations and modifications of the apparatus of this invention are possible, and such will readily occur to those skilled in the art. Accordingly, the scope of this invention is not to be limited to the embodiment disclosed, but is to include any such embodiments as may be encompassed within the scope of the claims appended hereto.

What is claimed is:

1. A personal computer (PC) card for telecommunications, said PC card comprising:

a wireless telephone;

telemetry signal receiver means for receiving a telemetry signal;

control means coupled to said wireless telephone and to said telemetry signal receiver means for controlling the operation OF said PC card, wherein when a telemetry signal is received said wireless telephone is controlled to automatically place a telephone call to a predetermined telephone number, wherein said control means includes a micro-processor for providing control commands to said wireless telephone and memory means for storing computer control instructions for said micro-processor; and selection means for selecting from a plurality of transmission protocols a protocol to be used by said wireless telephone, the selection of said protocol to be used to place said telephone call being controlled by said telemetry signal.

2. The PC card of claim 1, further including protocol selection means for selecting from a plurality of transmission protocols a protocol to be used by said wireless telephone.

3. The PC card of claim 1, wherein one of said protocols is Advanced Mobile Phone Service (AMPS) digital.

4. The PC card of claim 1, wherein one of said protocols is Advanced Mobile Phone Service (AMPS) analog.

5. The PC card of claim 1, wherein one of said protocols is Nordic Mobile Telephone (NMT).

6. The PC card of claim 1, wherein one of said protocols is Japanese-Total Access Communication System (J-TAC).

7. The PC card of claim 1, wherein one of said protocols is Total Access Communication System (TAC).

8. The PC card of claim 1, wherein one of said protocols is Groupe Speciale Mobile (GSM).

9. The PC card of claim 1, wherein one of said protocols is Time Division Multiple Access (TDMA).

10. The PC card of claim 1, wherein one of said protocols is Code Division Multiple Access (CDMA).

11. The PC card of claim 1, wherein one of said protocols is Wideband Code Division Multiple Access (W-CDMA).

12. The C card of claim 1, wherein said telemetry radio receiver is a frequency agile receiver.

13. The PC card of claim 1, further including Global Positioning System (GPS) receiver means for receiving a GPS position signal, said GPS receiver means being coupled to said control means.

14. A personal computer (PC) card for enabling a host device for use on a telecommunications network, said PC card comprising:

transmission and receiving circuitry forming a wireless telephone;

paging signal receiver means for receiving a paging signal;

control means coupled to said wireless telephone and to said paging signal receiver means, wherein when said paging signal receiver means receives a paging signal, said control means causes said wireless telephone to automatically place a telephone call to a predetermined telephone number; and protocol selection means for selecting from a plurality of transmission protocols a protocol to be used by said wireless telephone the selection of said protocol to be used to place said telephone call being controlled by said paging signal.

15. The PC card according to claim 14, wherein said control means includes a micro-processor and stored program instruction for providing said control functions.

16. The PC card of claim 14, further including protocol selection means for selecting from a plurality of transmission protocols a protocol to be used by said wireless telephones.

17. The PC card of claim 16, further including Global Positioning System (GPS) receiver means for receiving a GPS positioning signal.

18. The PC card of claim 17, wherein said Global Positioning System (GPS) signal is used to determine the location of said host device.

* * * * *